United States Patent [19]

Gardner et al.

[11] 4,364,663
[45] Dec. 21, 1982

[54] SURFACE ROUGHNESS GAUGE AND METHOD

[75] Inventors: Chester S. Gardner, Champaign; William E. Streight, East Peoria, both of Ill.

[73] Assignee: Caterpillar Tractor Co., Peoria, Ill.

[21] Appl. No.: 262,057

[22] Filed: Nov. 17, 1980

[51] Int. Cl.³ .................. G01B 11/30; G01N 21/55
[52] U.S. Cl. .................................. 356/371; 356/445; 356/446
[58] Field of Search ......... 356/371, 375, 376, 445–448

[56] References Cited

U.S. PATENT DOCUMENTS

| | | | |
|---|---|---|---|
| 3,804,521 | 4/1974 | Sprague | 356/446 X |
| 3,984,189 | 10/1976 | Seki et al. | 356/431 X |
| 4,172,666 | 10/1979 | Clarke | 356/446 X |
| 4,218,144 | 8/1980 | Whitehouse et al. | 356/446 |

*Primary Examiner*—Vincent P. McGraw
*Attorney, Agent, or Firm*—Charles E. Lanchantin, Jr.

[57] ABSTRACT

A compact gauge (10) for effectively measuring the surface roughness of an article (14) in any direction of lay includes: first means (30) for directing a light beam (32) upon a surface (12) of the article (14), second means (34) for providing a first signal proportional to the specular light reflected from the surface (12), the first and second means (30,34) defining a common plane (40), third means (58) for providing a second signal proportional to the diffused light reflected from the surface (12) in the common plane (40), and fourth means (61) for providing a third signal proportional to the diffused light reflected from the surface (12) to the side of the common plane (40). The subject gauge (10) includes a sensor head (28) that can be miniaturized and electrical circuit means (66,104) that can process the signals and provide a direct reading in micrometers independent of the reflectivity level of the surface.

18 Claims, 9 Drawing Figures

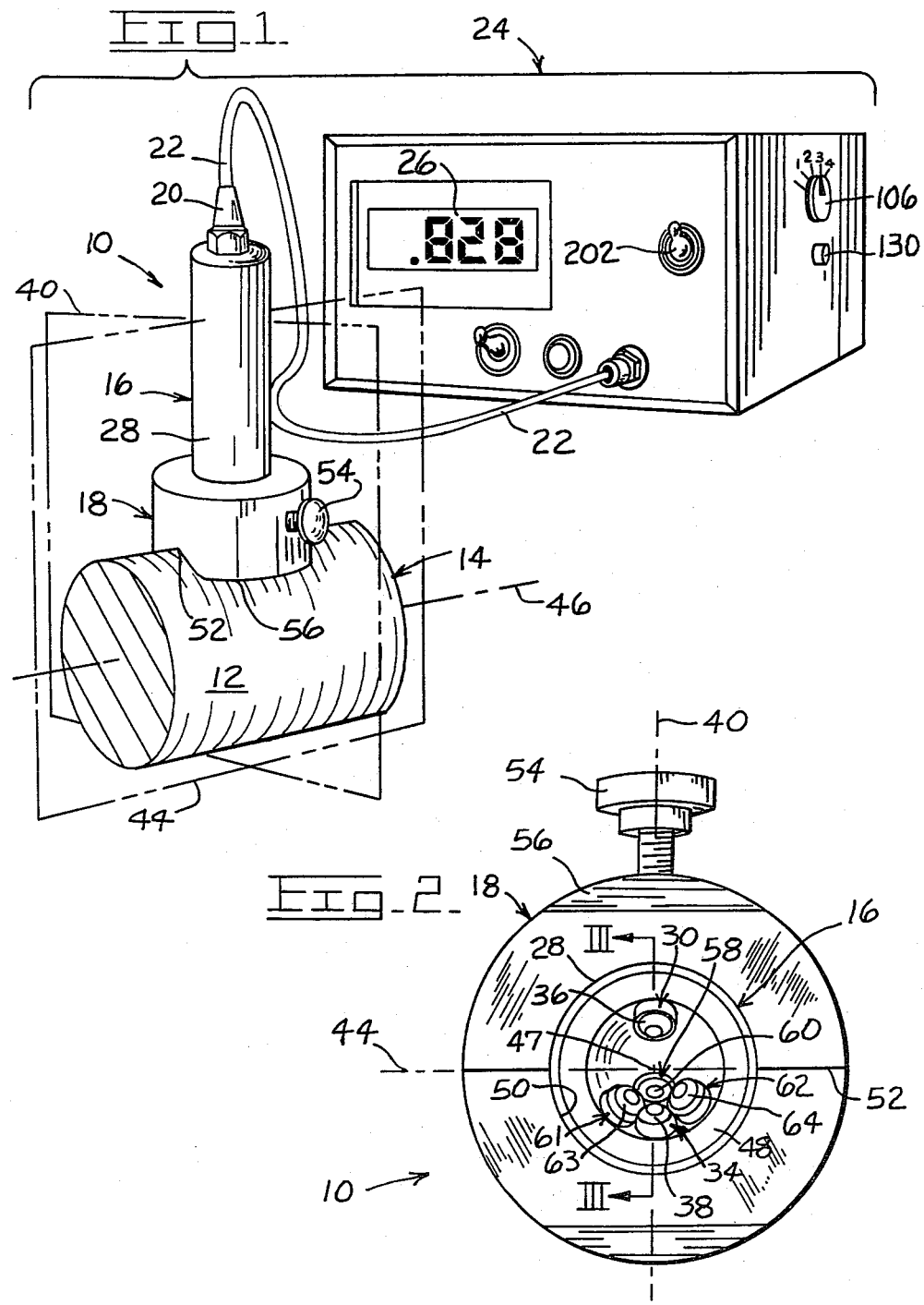

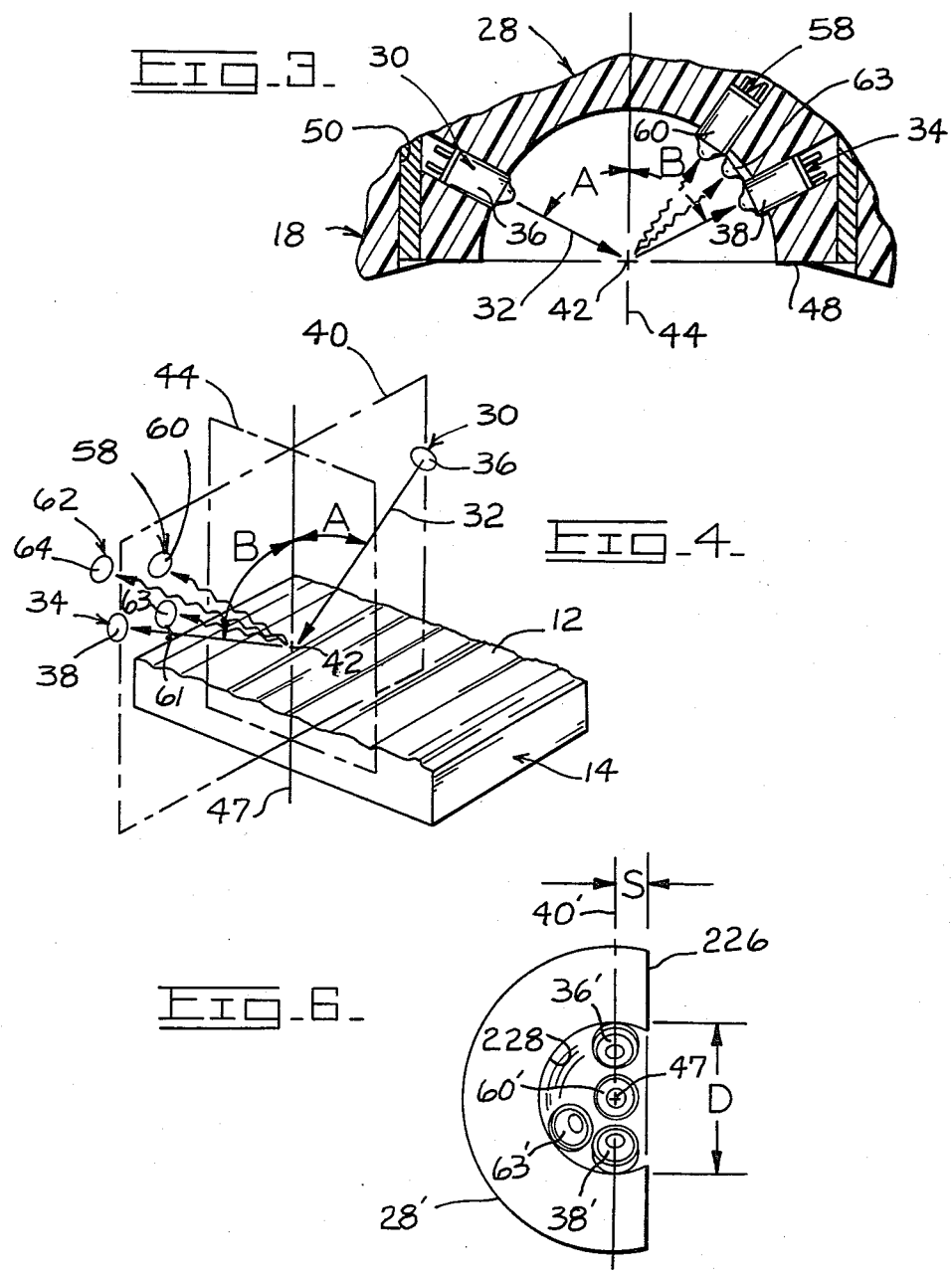

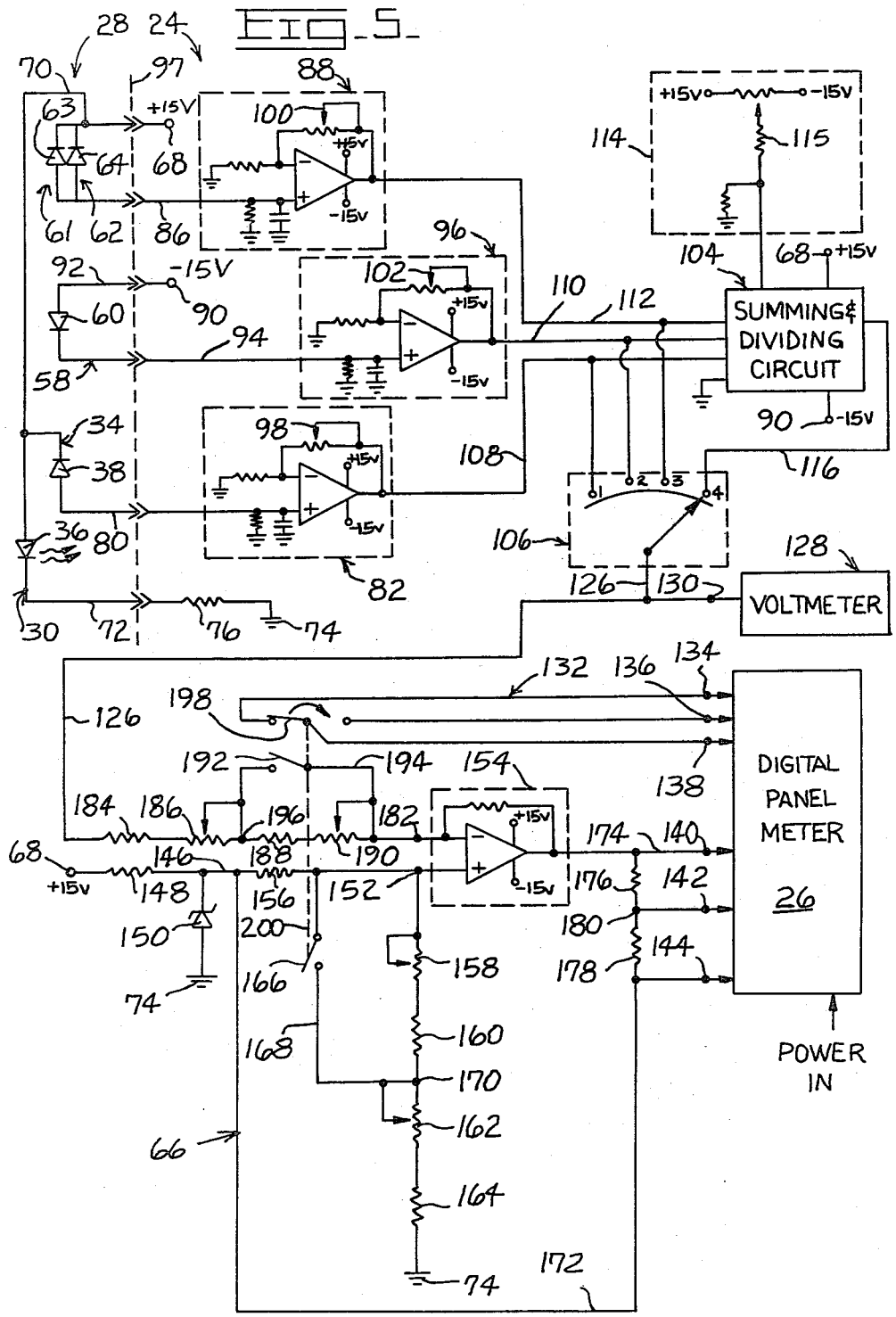

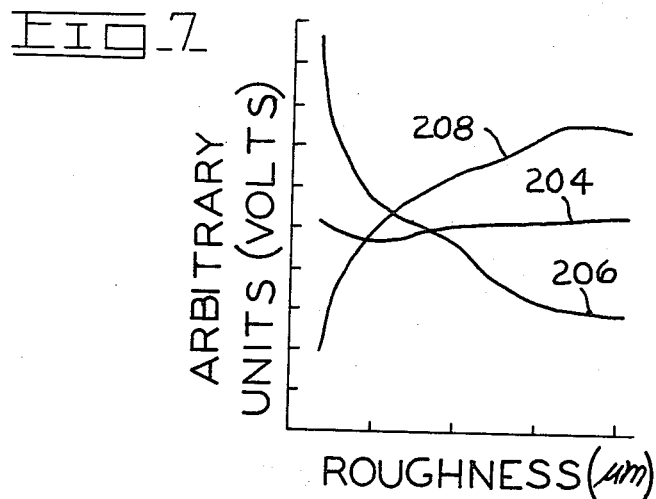
FIG_7
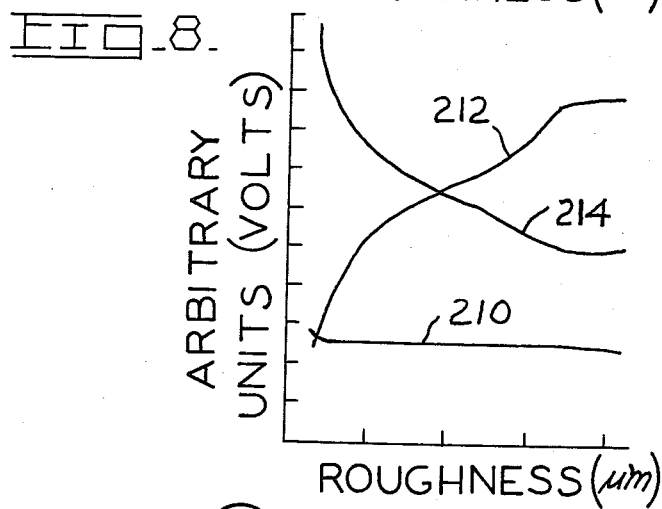
FIG_8
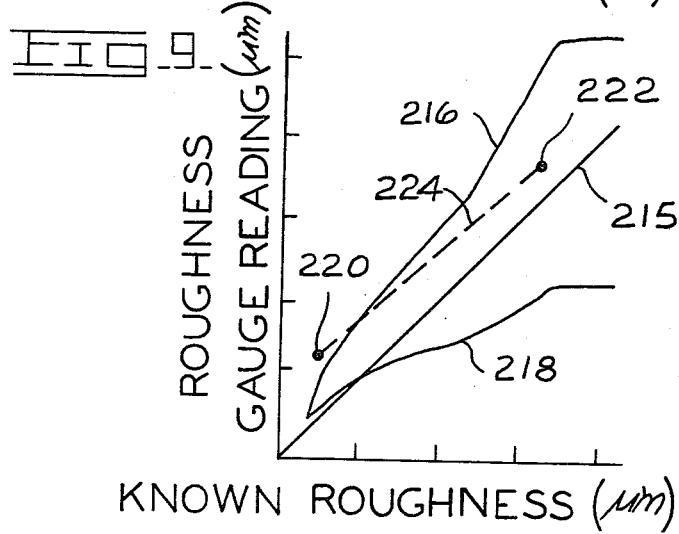
FIG_9

SURFACE ROUGHNESS GAUGE AND METHOD

DESCRIPTION

TECHNICAL FIELD

This invention relates generally to a gauge for measuring the surface roughness of an article, and more particularly to a non-contacting surface roughness gauge based on detecting and processing specular and diffused light.

BACKGROUND ART

Non-contacting surface measurement gauges are available which compare the relative quality of a test surface with respect to a known surface of the same type. Such gauges are offered commercially by Measurement Arts, Inc. of Providence, R.I. under the name Explorer I Surface Quality Measurement System. While that system has been accepted in the industry, it does not directly measure roughness in micrometers, it is undesirably sensitive to surface reflectivity, and it is limited to measuring surface quality at a right angle to the lay or to the direction of surface irregularities such as machining grooves. Another deficiency is that the measuring head thereof is too large so that it can't measure in tight spots. Specifically, that system cannot measure the cylindrical surface finish of a crankshaft bearing at the desired location relatively close to a crankshaft shoulder, for example.

Other surface quality gauges are known, such as those employing laser beams, which are excessively complex and fragile in construction. As far as is known, all known gauges must be recalibrated for each change in surface character, lay and/or reflectivity. Such recalibration has heretofore been too time-consuming and costly.

Accordingly, what is desired is a relatively inexpensive, compact and simple gauge that can provide a direct reading of the surface roughness of an article in micrometers or microinches independent of the direction of lay of the grinding or machining marks with but minor recalibration, and independent of the reflectivity of the surface. Another desired feature is to provide a gauge which can easily be recalibrated for measuring articles of different surface contour.

The present invention is directed to overcoming one or more of the problems as set forth above.

DISCLOSURE OF THE INVENTION

In one aspect of the invention a surface roughness gauge is provided having first means for directing a light beam upon a surface, second means for measuring the specular light reflected from the surface, third means for measuring the diffused light reflected from the surface in the plane of the first and second means, and fourth means for measuring the diffused light at one side of the plane.

In another aspect of the invention a surface roughness gauge is provided including first means for directing a light beam upon a surface, second means for providing a first signal proportional to the specular light reflected from the surface, third means for providing second and third signals proportional to the diffused light reflected from the surface at two locations, and fourth means for receiving the signals and displaying a reading directly corresponding to surface roughness.

In a further aspect of the invention a method of measuring the surface roughness of an article is provided which includes the steps of directing a beam of light from a first device upon the surface of the article, providing a first voltage signal at a second device proportional to the specular light reflected from the surface, providing a second voltage signal at a third device proportional to the diffused light reflected from the surface in a common plane with the first and second devices, and providing a third voltage signal at a fourth device proportional to the diffused light reflected from the surface at one side of the common plane. Preferably, the invention contemplates three photo diodes so located and constructed for receiving the reflected light from the surface of the article to be measured as to provide a resultant reading in micrometers after processing the signals therefrom in an associated control apparatus. Advantageously, the readings thus obtained can be made with any angular orientation of the gauge with respect to the lay of the surface irregularities, and substantially independent of the reflectivity of the surface. Specifically, at least one photo diode is located to one side of the central plane passing through a light emitting diode and a specular photo diode, and the electrical control apparatus processes the signals from the diodes to give a roughness factor. This roughness factor is electrically controlled to cause a readout meter to provide the resultant reading.

BRIEF DESCRIPTION OF THE DRAWINGS

FIG. 1 is a perspective elevational view of a surface roughness gauge constructed in accordance with one embodiment of the present invention and disposed on a cylindrical article to be measured.

FIG. 2 is a diagrammatic, enlarged, bottom plan view of the sensor head illustrated in FIG. 1.

FIG. 3 is a fragmentary, diagrammatic, side elevational sectional view as taken along line III—III of FIG. 2.

FIG. 4 is a fragmentary and diagrammatic view of a surface of an article of particular lay with certain components of the sensor head of FIGS. 1-3 placed in proper geometric position thereon for explanation purposes.

FIG. 5 is an electrical circuit for receiving and processing the signals from the sensor head of FIGS. 1-3, and directing them to the readout meter illustrated in FIG. 1.

FIG. 6 is a diagrammatic, enlarged, bottom plan view of a second embodiment sensor head that can be compared with the first embodiment of FIG. 2

FIG. 7 is a graph of the voltage signals individually delivered by the light receiving photo diodes of the sensor head illustrated in FIG. 2 for various degrees of surface roughness, with the sensor head disposed on a cylindrical pin and oriented such that the common midplane thereof was normal to the lay.

FIG. 8 is a graph similar to FIG. 7, only with the sensor head oriented such that the common midplane was parallel to the lay.

FIG. 9 is a graph showing the average roughness gauge readings achieved by processing the individually signals illustrated in FIGS. 7 and 8 in the control apparatus of the present invention in comparison with a range of known roughness values.

BEST MODE FOR CARRYING OUT THE INVENTION

Referring initially to FIG. 1, one embodiment of a surface roughness gauge 10 is disclosed for measuring the roughness of a cylindrical surface 12 of an article 14. The gauge includes a sensor body 16 releasably connected to a positioning device 18, a coupling 20 releasably connected to a control cable 22, and an electrically operated control apparatus or control box 24 adapted to receive and process the electrical information received from the sensor body by way of the control cable. Advantageously, the control box has a digital panel meter or readout meter 26 to permit convenient operator review of the output data in either micrometers or microinches.

As is shown in FIG. 2, the bottom end of the sensor body 16 includes a cylindrical sensor head 28 having a diameter of about 2.54 cm (1"). As is shown also in FIGS. 3 and 4, the sensor head 28 has mounted in relatively fixed positions thereon first means 30 for directing a light beam 32 upon the surface 12 of the article 14 and second means 34 for receiving the specular light reflected from the surface and providing a first voltage signal proportion thereto. By the term "light beam" as used herein it is meant to include a beam of electromagnetic radiation having a wave length at or near the infrared and visible ranges. The first means 30 includes a light emitting diode (LED) 36 and the second means 34 includes a first photo diode 38. Diodes 36 and 38 are arranged in a common midplane 40 disposed normal to the surface to be measured at a point of incidence 42, and with the axes of the diodes arranged such that the angle of incidence A is equal to the angle of reflection B. A second plane 44 is located through the point of incidence and disposed at a right angle to the common plane 40. In the example of FIG. 1, the article 14 is a cylindrical pin having a central axis 46 and the second plane 44 contains the central axis. Thus, the diodes 36 and 38 are disposed in facing relation at equal distances from the second plane 44 as is indicated in the drawings. Since the specular photo diode 38 is at the same angle with respect to the surface being measured as the light emitting diode 36, the voltage output thereof represents the reflectivity of the surface being measured.

The sensor head 28 has a central axis 47 and a planar end face 48 oriented normal to the central axis and located axially in line with the point of incidence 42. With such construction the sensor head can be manually adjusted vertically within a cylindrical opening 50 in the positioning device 18 in order to place the point of incidence 42 of the diodes 36,38 in coinciding relationship with the surface level to be measured. Since the article in the example is cylindrical, the positioning device is basically an inverted V-block with an apex 52 thereof being capable of convenient orientation parallel to the axis 46 as is shown in FIG. 1. A manually releasable thumb screw 54 can be utilized to lock the sensor body 16 and positioning device 18 together upon reaching the desired elevational and rotational relationsip. Alternatively, a pair of planar end surfaces 56 on the positioning device 18 can be used to orient the sensor body normal to a flat surface to be measured, not shown.

As shown in FIGS. 2-4, the sensor head 28 further has third means 58 for receiving the diffused light reflected from the surface 12 in the common plane 40 of the diodes 36,38 and providing a second voltage signal proportional thereto. Such third means includes a second photo diode 60 of the same type as specular diode 38, and being located on the forward side thereof for purposes of compactness. Like the diode 38, the diode 60 is axially oriented toward the point of incidence 42. Advantageously, the sensor head also has fourth means 61 mounted thereon for receiving the diffused light reflected from the surface 12 to the left side of the common plane 40 and fifth means 62 for receiving the diffused light reflected from the right side of the common plane and jointly providing a third voltage signal proportional thereto. The fourth means includes a third photo diode 63 and the fifth means includes a fourth photo diode 64 of the same type as the diodes 38 and 60 and also oriented toward the point of incidence 42. In this way, and as best shown in FIG. 2, the first, second, third and fourth photo diodes 38,60,63 and 64 are nestably mounted compactly together in a substantially preselected quadralateral relationship on the sensor head 28 to receive the light from the opposite light emitting diode 36.

Turning now to the control portion of the gauge 10, the control apparatus 24 includes electrical circuit means 66 as is shown in FIG. 5. The electrical circuit means is electrically connected to the diodes 36, 38, 60,63 and 64 and receives and processes the first, second and third signals from the first, second, and joint third and fourth photo diodes respectively. A preselected voltage source 68, for example 15 volts positive, is connected to the anode of the light emitting diode 36 via a line 70, and a line 72 connects the cathode thereof to a ground 74 through a fixed resistor 76. The same voltage source in line 70 is connected to the cathode of the first photo diode 38 and a first output signal line 80 extends from the anode thereof to a first operational amplifier 82 for purposes of gain control. The same voltage source is connected to the cathodes of the third and fourth photo diodes 63,64 and a third output signal line 86 is connected to the anode thereof and to a third operational amplifier 88. Another voltage source 90, of opposite polarity but at the same value as source 68, is connected to the anode of the second photo diode 60 by a line 92, and a second output signal line 94 extends from the cathode thereof to a second operational amplifier 96. It is to be noted that the lines 70, 72, 80, 86, 92 and 94 extend through and form a major portion of the control cable 22 in FIG. 1, and are separable at the coupling 20. This separation is indicated in FIG. 5 by the broken vertical line 97, which line also separates the components on the sensor head 28 with those within the control apparatus 24.

The operational amplifiers 82,88 and 96 are of conventional construction and include variable resistors 98,100 and 102 respectively for adjusting the gain of the individual signals received from the photo diodes 38, 60 and 63/64. The suitably amplified first signal from the amplifier 82 is connected to a summing and divider circuit 104 and also to a display select switch 106 via a line 108. Similarly, the amplified second signal from the amplifier 96 is connected to the summing and divider circuit and the select switch via a line 110, and the amplified third signal from the amplifier 88 is connected to the summing and divider circuit and the select switch via a line 112.

An intercept variable voltage control 114 having a resistor 115 is connected to the summing and divider circuit 104, as are the voltage sources 68 and 90, and an output line 116 from the circuit is connected to the select switch 106. Thus, the select switch is capable of electrically connecting one of four contact points identified as Nos. 1-4 in FIG. 5 with an output line 126. A conventional voltmeter 128 can be connected to the output line 126 at a contact point 130 to selectively take readings of the four contact points for initial calibration purposes.

The surface roughness gauge 10 has the capability for convenient changeover in the readings at the digital panel meter 26 from micrometers to microinches. To accomplish this a compensation and switchover network 132 is used between the output line 126 and the panel meter. In the illustrated embodiment the digital panel meter is a conventional unit, such as Model No. DM-3100X offered by Datel Systems, Inc. of 11 Cabot Blvd., Mansfield, Maine. It has six connection points 134, 136, 138, 140, 142 and 144 to the compensation network.

A substantially constant voltage of 6.8 volts is established at a line 146 of the compensation network 132, by connecting the voltage source 68 to the line 146 through a resistor 148 and by connecting a Zener diode 150 of preselected capacity to the ground 74. The line 146 is connected to a first input point 152 of a comparator operational amplifier 154 through a fixed resistor 156. The first input point 152 is further connected to the ground through first, second, third and fourth serially arranged resistors 158, 160, 162 and 164. Resistors 158 and 162 are variable resistors, and resistors 160 and 164 are fixed resistors. The upper resistors 158 and 160 are used for adjusting the input voltage to the first input point 152 when in the micrometer mode of operation, and these resistors are bypassed from the circuit by closing a first switch 166 in a bypass line 168 connected between point 152 and another point 170 between resistors 160 and 162. Hence, when the switch 166 is closed, resistors 162 and 164 are adjustable to adjust the input voltage in the microinch mode, and when the switch is open the resistors 158 and 160 are adjustable to adjust the input voltage in the micrometer mode.

A line 172 connects the relatively stable voltage at line 146 to an output readout line 174 from the operational amplifier 154 through a pair of serially arranged fixed resistors 176 and 178 of relatively high resistance, for example one megohm each. The connection point 142 is connected to a point 180 between the resistors 176, 178 and the connection point 144 is connected to the line 172 before the resistors 176, 178.

A second input point 182 to the comparator operational amplifier 154 is connected to the output line 126 from the select switch 106 through first, second, third and fourth serially arranged resistors 184, 186, 188 and 190. Resistors 184 and 188 are of fixed capacity, and resistors 186 and 190 are of variable capacity. When viewing FIG. 5, the right resistors 188 and 190 are used for adjusting the input voltage to the second input point 182 when in the micrometer mode of operation, and these resistors are bypassed from the circuit by closing a second switch 192 in a bypass line 194 connected between second input point 182 and another point 196 located between resistors 186 and 188. Therefore, when the second switch 192 is closed resistors 184 and 186 are adjustable to control the reference gain in the microinch mode, and when the second switch is open resistors 188 and 190 are adjustable to control the reference gain in the micrometer mode.

Because of the well-known conversion factor of 39.37 between micrometers and microinches, a decimal point correction is required of the digital panel meter 26. This is achieved by using a third switch 198 to directly connect connection points 134 and 138 or 136 and 138. The switches 166, 192 and 198 are preferably connected together for joint operation as diagrammatically indicated by the broken line 200 in FIG. 5 and, as shown in FIG. 1, a single control lever 202 on the face of the control box 24 is effective to jointly move them. When the control lever 202 is up roughness is measured in micrometers, the switches 166 and 192 are open as indicated in FIG. 5, and the switch 198 connects connection points 134 and 138 directly together. On the other hand, when the control lever 202 is down roughness is measured in microinches, the switches 166 and 192 are closed, and the switch 198 connects connection points 136 and 138.

INDUSTRIAL APPLICABILITY

The voltmeter 128 initially can be used to take a series of voltage output readings at the contact points 1, 2 and 3 of the display select switch 106. These output readings correspond to the amplified values of the first, second and third signals received from the photo diodes 38, 60 and 63/64. To take these readings the sensor head 28 can be positioned on a series of cylindrical surfaces individually having different standard or known roughness values and with the common plane 40 of the sensor head 28 positioned normal to or at a right angle to the lay. If the output readings are plotted in arbitrary voltage units on a vertical or ordinate scale and the known roughness values in micrometers plotted on a horizontal or abscissa scale, the result will be generally like the graph illustrated in FIG. 7. Note that the third and fourth diffused side photo diodes 63, 64 provide an output voltage at the contact point 3 that is substantially constant as is indicated by the generally horizontal line 204, while the output of the specular photo diode 38 at the contact point 1 decreases with increasing surface roughness as is indicated by the line 206 and the output of the diffused forward photo diode 60 at the contact point 2 increases as is indicated by the line 208.

Upon rotating the sensor head 28 to an orientation parallel to the lay, or so that the common midplane 40 is parallel to the direction of run of the indentations in the surface, and taking another series of voltage readings of cylinders with different known roughness values, another graph can be made such as that illustrated in FIG. 8. Note that the diffused forward photo diode 60 provides an output voltage at the contact point 2 that is substantially constant or generally horizontal as is indicated by the line 210. Simultaneously, the output of the diffused side photo diodes 63, 64 at the contact point 3 increases with increasing surface roughness, as indicated by line 212, and the output of the specular photo diode 38 at the contact point 1, decreases as indicated by line 214.

We have observed the relationships illustrated by the graphs of FIGS. 7 and 8, and have concluded that a substantially straight line increasing relationship can be obtained with these data by manipulating the voltage signals in a preselected manner. Specifically, we have concluded that the following relationship can be utilized to advantage:

$$\frac{\text{Roughness}}{\text{Factor}} = \frac{\text{Voltage Output at 2} + \text{Voltage Output at 3}}{\text{Voltage Output at 1}}$$

The summing and dividing circuit 104, such as is available as Part No. AD535 from Analog Devices of Norwood, Mass. performs the relationship of the above equation, and provides a roughness factor at the contact point 4 of the display select switch 106. Since the output of each diode will decrease with a decrease in surface reflectivity, the roughness factor is advantageously independent of surface reflectivity. With these data the average roughness values at the panel meter 26 can be directly related to the roughness factors by the following second equation:

Average Roughness = $m$ (Roughness Factor) + $I$ wherein: m = a slope correction
I = an intercept correction While the roughness gauge readings on the panel meter 26 should theoretically be directly related to the series of known surface roughnesses of gradually increasing magnitude as is indicated by the straight line 215 in the graph of FIG. 9, uncalibrated curves or slightly crooked lines 216 and 218 are more typically obtained. Line 216, for example, represents the uncalibrated increasing roughness values for the gauge 10 with an orientation normal to the lay, and line 218 represents the uncalibrated increasing roughness values with the orientation parallel to the lay.

In order to initially calibrate the electrical circuit means 66, the sensor head 28 is positioned on a standard or known reference at the low end of the desired roughness range, for example at 0.05 micrometer (2 microinch) surface roughness, and then at the high end, for example at 0.43 micrometer (17 microinch) surface roughness. If the respective first and second gauge readings are as shown at points 220 and 222 on the graph of FIG. 9, a straight broken line 224 drawn therebetween will indicate that the gauge readings are slightly offset from the desired line 215. In order to change the position of the line 224 the resistor 115 of the intercept variable voltage control 114 illustrated in FIG. 5 can be manually adjusted relative to its voltage input to move line 224 up and down, or vertically when viewing the graph at the same approximate slope. In other words, the intercept variable voltage control 114 functions to provide the desired value "I" in the second equation set forth above. Assuming that line 224 is lowered, so that the bottom end thereof coincides with line 215, then the gain of first operational amplifier 82 can thereafter be changed by manually adjusting the variable resistor 98 to rotate the line 224 or to increase the slope thereof so that it substantially coincides with the desired line 215. Thus, a calibration technique is available for conveniently modifying the gauge 10 so that it can measure cylindrical pins with the gauge oriented with the lay or normal to the lay of the surface irregularities, and with the gauge readings being precisely matched to known or controlled roughness values. Furthermore, similar relationships exist with respect to measuring flat surfaces or other arcuate surfaces.

SECOND EMBODIMENT

While the first embodiment of the surface roughness gauge 10 has proven to be very satisfactory for most applications, it was observed that it could not measure as close as desired to a flange because of its diameter or size. Accordingly, for this purpose a miniaturized second embodiment of the gauge 10 was constructed as is illustrated in FIG. 6. Reference numerals having a prime indicator thereon have been used in FIG. 6 to identify parts similar in function to those described with respect to the first embodiment.

It will be initially noted from FIG. 6 that the right side or right portion of the sensor head 28' has been removed so that the distance "S" between the central plane 40' and a side surface 226 thereof is minimized. A distance "S" of less than about 4 mm (0.16") can be obtained by deleting one of the side diffused photo diodes 63,64 of the first embodiment, by miniaturizing the remaining photo diodes 38',60',63' and light emitting diode 36', and by placing them relatively compactly together. In the instant example, the forward diffused diode 60' is axially oriented along the central axis 47, and remaining diodes placed immediately therearound in a semi-spherical, outwardly opening cavity 228 measuring less than about 5 mm (0.2") in diameter (D) as can be recognized by reference to FIG. 6. The diodes 36',38',60' and 63' are miniaturized and are available from Spectronics of 830 E. Arapaho Rd., Richardson, Tex.

Thus it may be appreciated that the surface roughness gauge 10 advantageously incorporates at least one photo diode 63 or 64 for measuring diffused light reflected from the surface of the article to the side of the common plane 40 in order to be useful for measuring roughness with the gauge oriented parallel to the lay. It further incorporates a diffused forward diode 60 useful for measuring scattered light when the gauge is oriented perpendicular to the lay. In either instance, the versatile relationship of the voltage signals received from the diffused forward diode, the diffused side diode, and the specular diode has been so programmed in the control apparatus 24 as to be of a substantially increasing straight line signal reading with increasing surface roughness of the article being measured. Such readings are independent of the reflectivity level of the surface being measured. The compensation and switch over network 132 serves to conveniently convert the roughness factors directly to actual micrometer or microinch readings. Advantageously the observed readings are substantially instantantaneously displayed on the readout meter 26.

Other aspects, objects and advantages of this invention can be obtained from a study of the drawings, the disclosure and the appended claims.

We claim:
1. A surface roughness gauge (10) comprising:
   first means (30) for directing a light beam (32) directly upon a surface (12) of an article (14) to be measured;
   second means (34) for providing a first signal proportional to the specular light reflected from the surface (12), the first and second means (30,34) defining a common plane (40);
   third means (58) for providing a second signal proportional to the diffused light reflected from the surface (12) in the common plane (40);
   fourth means (61) for providing a third signal proportional to the diffused light reflected from the surface (12) to the side of the common plane (40); and
   fifth means (24) for receiving and processing the first, second and third signals and displaying a reading (26) directly corresponding to surface roughness in a linear unit of measurement.

2. The gauge (10) of claim 1 wherein the second means (34) includes a first photo diode (38), the third means (58) includes a second photo diode (60), and the fourth means (61) includes a third photo diode (63/64).

3. The gauge (10) of claim 2 including a sensor head (28) and wherein the diodes (36,38,60,63/64) are each mounted in fixed positions on the sensor head (28).

4. The gauge (10) of claim 3 wherein sensor head (28) defines an outwardly opening cavity (228), and the diodes (36',38',60', and 63') are miniaturized and are positioned in the cavity to be aimed toward a common point of incidence (42).

5. The gauge (10) of claim 4 wherein the sensor head (28) defines a side surface (226) parallel to the common plane (40) and less than about 4 mm from the common plane (40).

6. The gauge (10) of claim 3 wherein the sensor head (28) defines an outwardly opening cavity (228), the diodes (36',38',60',63') open outwardly into the cavity (228), and the cavity (228) is less than about 5 mm is size.

7. The gauge (10) of claim 1 wherein the fifth means (24) includes electrical circuit means (66,104) for adding the second and third signals together, dividing the result by the first signal and providing a roughness factor, and converting the roughness factor to a direct reading.

8. The gauge (10) of claim 7 wherein the fifth means (24) includes a digital readout meter (26) for visual observation of the direct reading.

9. The gauge (10) of claim 8 wherein the electrical circuit means (66) includes selector means (202,166,192,198) for indicating one of micrometers and microinches on the readout meter (26).

10. A surface roughness gauge (10) for measuring the surface (12) of an article (14), comprising:
 first means (30) for directing a light beam directly upon the surface (12) and including a light emitting diode (36);
 second means (34) for providing a first signal proportional to the specular light reflected from the surface (12) and including a first photo diode (38) defining a common plane (40) with the light emitting diode (36);
 third means (58) for providing a second signal proportional to the diffused light reflected from the surface (12) and including a second photo diode (60) disposed on the common plane (40);
 fourth means (61) providing a third signal proportional to the diffused light reflected from the surface (12) and including a third photo diode (63) located to the side of the common plane (40);
 a sensor head (28) for mounting the diodes (36,38,60,63) is fixed positions thereon; and
 fifth means (24,66) for receiving and processing said first, second and third signals and displaying a reading (26) directly corresponding to surface roughness in a linear unit of measurement.

11. The gauge (10) of claim 10 wherein the sensor head (28) is cylindrical and has a diameter of about 2.54 cm.

12. The gauge (10) of claim 10 including positioning means (18) for adjusting the position of the sensor head (28) relative to the surface (12) of the article (14).

13. The gauge (10) of claim 10 wherein the sensor head (28) defines an outwardly opening cavity (228) less than about 5 mm in size, the diodes (36,38,60,63) being positioned to open outwardly into the cavity (228).

14. The gauge (10) of claim 10 wherein the fifth means (24,66) includes electrical circuit means (66,104) for substantially adding the second and third signals and providing a result, dividing the result by the first signal and providing a roughness factor, and converting the roughness factor to a direct reading.

15. The gauge (10) of claim 14 wherein the fifth means (24,66) includes a readout meter (26) of a construction sufficient for indicating one of micrometers and microinches.

16. A method of measuring the surface roughness of an article (14) comprising:
 directing beam of light from a first device (36) upon the surface (12) of the article (14);
 providing a first voltage signal at a second device (38) proportional to the specular light reflected from the surface (12);
 providing a second voltage signal at a third device (60) proportional to the diffused light reflected from the surface (12) in a common plane (40) with the first and second devices (36,38);
 providing a third voltage signal at a fourth device (63) proportional to the diffused light reflected from the surface (12) at one side of the common plane (40); and
 processing the first, second and third voltage signals and displaying a reading (26) directly corresponding to surface roughness in a linear unit of measurement.

17. The method of claim 16 including adding the second and third voltage signals together and dividing the result by the first voltage signal and providing a roughness factor.

18. The method of claim 17 including electrically converting the roughness factor to a direct reading of surface roughness on a readout meter (26).

* * * * *